(12) United States Patent
Ho

(10) Patent No.: US 10,531,733 B1
(45) Date of Patent: Jan. 14, 2020

(54) ADJUSTABLE CLAMP HAVING MOVABLE FOLLOWER

(71) Applicant: Oxti Corporation, Taipei (TW)

(72) Inventor: Chih Feng Ho, Taipei (TW)

(73) Assignee: Oxti Corporation, Chungho, Taipei (TW)

( * ) Notice: Subject to any disclaimer, the term of this patent is extended or adjusted under 35 U.S.C. 154(b) by 0 days.

(21) Appl. No.: 16/207,259

(22) Filed: Dec. 3, 2018

(51) Int. Cl.
*A47B 23/02* (2006.01)
*A47B 21/03* (2006.01)
*F16M 11/10* (2006.01)
*F16M 13/02* (2006.01)

(52) U.S. Cl.
CPC .......... *A47B 23/02* (2013.01); *A47B 21/0314* (2013.01); *F16M 11/10* (2013.01); *F16M 13/022* (2013.01); *F16M 2200/024* (2013.01); *F16M 2200/068* (2013.01); *F16M 2200/08* (2013.01)

(58) Field of Classification Search
CPC ....... A47B 23/02; A47B 23/025; A47B 23/04; A47B 21/0314; F16M 11/10; F16M 13/022; F16M 2200/024; F16M 2200/068; F16M 2200/08
USPC .... 248/205.1, 235, 245, 251, 231.61, 230.5, 248/228.5, 229.24, 229.14
See application file for complete search history.

(56) References Cited

U.S. PATENT DOCUMENTS

| 4,494,177 | A | 1/1985 | Matthews |
| 4,569,498 | A | 2/1986 | Ermanski |
| 4,582,307 | A | 4/1986 | Wang |
| 4,627,604 | A | 12/1986 | Choi |
| 4,736,878 | A | 4/1988 | Rasor |
| 4,874,155 | A | 10/1989 | Goul |
| 4,921,234 | A | 5/1990 | Peterson |
| 5,180,220 | A | 1/1993 | Van Kalsbeek |
| 5,370,570 | A | 12/1994 | Harris |
| 5,423,525 | A | 6/1995 | Spainhower |
| 5,765,902 | A | 6/1998 | Love |
| 5,833,180 | A | 11/1998 | Baranowski |
| 5,833,189 | A * | 11/1998 | Rossman ............... A47G 19/10 248/231.61 |
| 6,032,939 | A | 3/2000 | Chen |
| 6,086,228 | A | 7/2000 | McGowan et al. |
| 6,375,140 | B1 * | 4/2002 | Shen ........................ A47H 1/14 160/181 |
| 6,394,403 | B1 | 5/2002 | Hung |
| 6,478,275 | B1 | 11/2002 | Huang |
| 6,705,217 | B1 * | 3/2004 | Godsey ................. B41F 17/001 101/35 |
| 7,104,673 | B2 | 9/2006 | Yu |

(Continued)

*Primary Examiner* — Nkeisha Smith
(74) *Attorney, Agent, or Firm* — Charles E. Baxley

(57) ABSTRACT

An adjustable clamp includes a carrier member to be supported on a table plate, a fastener is rotatably engaged in a compartment of the carrier member, a follower is slidably engaged in the carrier member and includes a screw hole for engaging with the fastener, and an anchoring element includes an upper limb for engaging with the follower, and a middle limb arranged between the upper limb and a lower limb for allowing the table plate to be engaged between the upper limb and the lower limb, and for allowing the lower limb to be forced to engage with the table plate when the follower is moved relative to the carrier member with the fastener.

6 Claims, 5 Drawing Sheets

(56) References Cited

U.S. PATENT DOCUMENTS 7,121,516 B1 * 10/2006 Koh .................... A47B 17/033
              248/226.11
8,485,509 B2 *  7/2013 Wang ...................... B25J 15/00
              269/249

* cited by examiner

ADJUSTABLE CLAMP HAVING MOVABLE FOLLOWER

BACKGROUND OF THE INVENTION

1. Field of the Invention

The present invention relates to an adjustable clamp or screw clamp or support device, and more particularly to an adjustable clamp including an improved structure arranged for allowing the adjustable clamp to be easily actuated or operated by the user, and including an anchoring board attachable to a carrier member for allowing the carrier member to be easily engaged through a tiny space beside an edge portion of a table plate.

2. Description of the Prior Art

Typical adjustable clamps comprise a C-shaped clamp body, and a bolt or screw threaded and attached or mounted to one end of the clamp body and rotatable and movable or adjustable toward the other end of the clamp body for attaching or mounting or securing or clamping the clamp body onto various supporting members or tables.

For example, U.S. Pat. No. 4,494,177 to Matthews, U.S. Pat. No. 4,569,498 to Ermanski, U.S. Pat. No. 4,582,307 to Wang, U.S. Pat. No. 4,627,604 to Choi, U.S. Pat. No. 4,736,878 to Rasor, U.S. Pat. No. 4,874,155 to Goul, U.S. Pat. No. 4,921,234 to Peterson, U.S. Pat. No. 5,180,220 to Van Kalsbeek, U.S. Pat. No. 5,370,570 to Harris, U.S. Pat. No. 5,423,525 to Spainhower, U.S. Pat. No. 5,765,902 to Love, U.S. Pat. No. 5,833,180 to Baranowski, U.S. Pat. No. 5,833,189 to Rossman et al., U.S. Pat. No. 6,032,939 to Chen, U.S. Pat. No. 6,086,228 to McGowan et al., U.S. Pat. No. 6,375,140 to Shen, U.S. Pat. No. 6,394,403 to Hung, U.S. Pat. No. 6,478,275 to Huang, and U.S. Pat. No. 7,104,673 to Yu disclose several of the typical adjustable clamps, clamp bases or the like each also comprising a bolt or screw threaded and attached or mounted to one end of the clamp body for clamping onto various supporting members or tables and for supporting the other members or objects, such as the keyboards, the monitors or the like.

However, the clamp body includes a solid and spatial structure that may not be folded to the compact folding structure and that may not be easily and quickly attached or mounted or secured or clamped onto various supporting members or tables. The users have to bend or squat lower than the supporting members or tables for actuating or operating or rotating or driving the screw or bolt to attach the clamp body onto the supporting members or tables such that the typical adjustable clamps may not be easily actuated or operated by the user.

The present invention has arisen to mitigate and/or obviate the afore-described disadvantages of the conventional adjustable clamps or carriers or support devices.

SUMMARY OF THE INVENTION

The primary objective of the present invention is to provide an adjustable clamp including an improved structure arranged for allowing the adjustable clamp or carrier or support device to be easily actuated or operated by the user.

The other objective of the present invention is to provide an adjustable clamp including a clamping device having one or more anchoring elements attachable to a carrier member for allowing the anchoring elements to be easily and quickly and readily engaged through a tiny space beside an edge portion of a table plate.

In accordance with one aspect of the invention, there is provided an adjustable clamp for attaching to a table plate, comprising a carrier member to be supported on the table plate, the carrier member including a compartment formed in the carrier member, the carrier member including an attachment mechanism for supporting an object, at least one fastener rotatably received and engaged in the compartment of the carrier member and extended up and down relative to the carrier member, a follower slidably received and engaged in the compartment of the carrier member, the follower including a screw hole formed in the follower for threading and engaging with the fastener and for allowing the follower to be moved up and down relative to the carrier member when the fastener is rotated relative to the carrier member, the follower including an anchoring orifice formed in the follower, and a clamping device including an anchoring element having an upper limb for engaging with the anchoring orifice of the follower, a lower limb, and a middle limb arranged between the upper limb and the lower limb for forming a C-shaped structure, and for allowing the table plate to be engaged between the upper limb and the lower limb of the anchoring element, and for allowing the lower limb of the anchoring element to be forced to engage with the table plate and to secure the follower and the carrier member to the table plate when the follower and the anchoring element are moved up and down relative to the table plate and the carrier member with the fastener. The driver tool for engaging with and for actuating or operating or rotating or driving the fastener is arranged and located above the carrier member and the table plate while or when the driver tool is rotated or driven or actuated or operated by the user, such that the adjustable clamp may be easily actuated or operated by the user without working under the table plate.

The carrier member includes a guide protrusion extended into the compartment of the carrier member, and the follower includes a guide slot formed in the follower for slidably engaging with the guide protrusion of the carrier member and for guiding and limiting the follower to move relative to the carrier member and for preventing the follower from moving laterally relative to the carrier member.

The fastener includes a non-circular engaging hole formed in the fastener for engaging with a driver tool and for allowing the fastener to be easily actuated or operated by the driver tool. The follower includes a tilted surface located below the anchoring orifice of the follower for suitably guiding the upper limb of the anchoring element to easily engage into the anchoring orifice of the follower.

The carrier member includes a hood engaged onto the carrier member for covering or shielding the carrier member, the hood includes a groove formed in the hood and aligned with the anchoring orifice of the follower for slidably engaging with the upper limb of the anchoring element and for allowing the anchoring element to be moved up and down relative to the carrier member when the follower is moved up and down relative to the carrier member. The hood includes an aperture formed in the hood for receiving and engaging with the attachment mechanism of the carrier member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
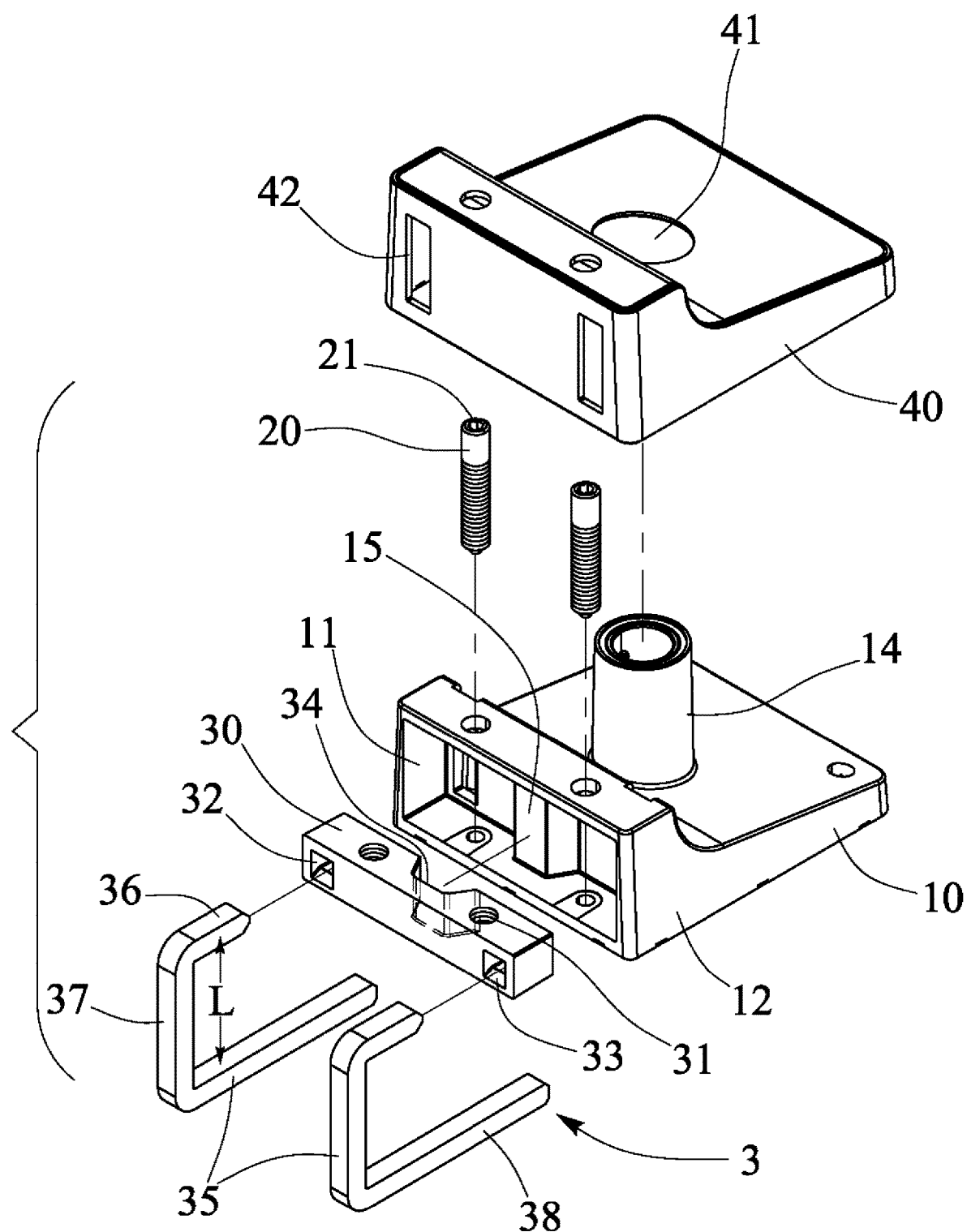
FIG. 1 is a partial exploded view of an adjustable clamp in accordance with the present invention.
Figure 2:
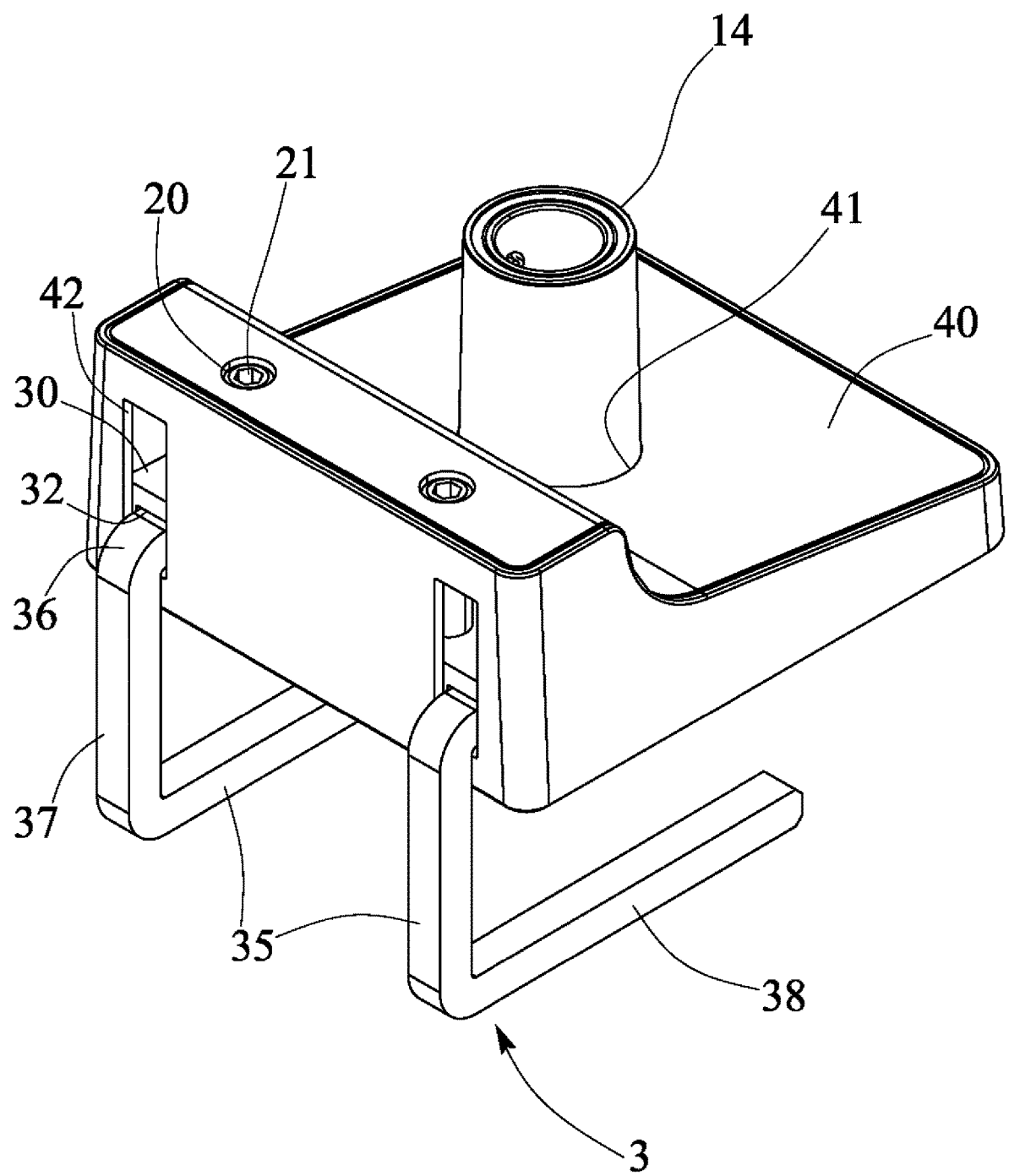
FIG. 2 is a perspective view of the adjustable clamp.

Referring to the drawings, and initially to FIGS. 1-4, an adjustable clamp in accordance with the present invention comprises a housing or receptacle or block or turret or seat or carrier or support plate or member 10 arranged to be engaged onto and supported on the upper surface 80 of the table plate 8 (FIGS. 5-8), the carrier member 10 includes a chamber or compartment 11 formed therein (FIG. 1), such as formed in the rear portion 12 thereof, and having a non-circular cross section and opened rearwardly, and includes an aperture or orifice or opening or attachment mechanism 14 provided thereon for attaching or mounting an object or apparatus or facility (not illustrated), such as keyboard, light or lamp, monitor, displayer or the like, to the carrier member 10. The carrier member 10 further includes a guide rib or rail or protrusion 15 extended into the compartment 11 of the carrier member 10 (FIG. 1).

One or more (such as two) bolts or screws or fasteners 20 are pivotally or rotatably received or engaged and/or supported in the compartment 11 of the carrier member 10 and extended up and down or vertically relative to the carrier member 10, and the fasteners 20 each include a non-circular, such as hexagonal engaging hole 21 formed therein for receiving or engaging with a driver tool 23 (FIGS. 3, 6) which may be used for actuating or operating or rotating or driving the fastener 20 relative to the carrier member 10. It is to be noted that the driver tool 23 for engaging with and for actuating or operating or rotating or driving the fastener 20 may be arranged and located above the carrier member 10 and the table plate 8 while or when the driver tool 23 is rotated or driven or actuated or operated by the user, such that the adjustable clamp in accordance with the present invention may be easily actuated or operated by the user.

Figure 3:
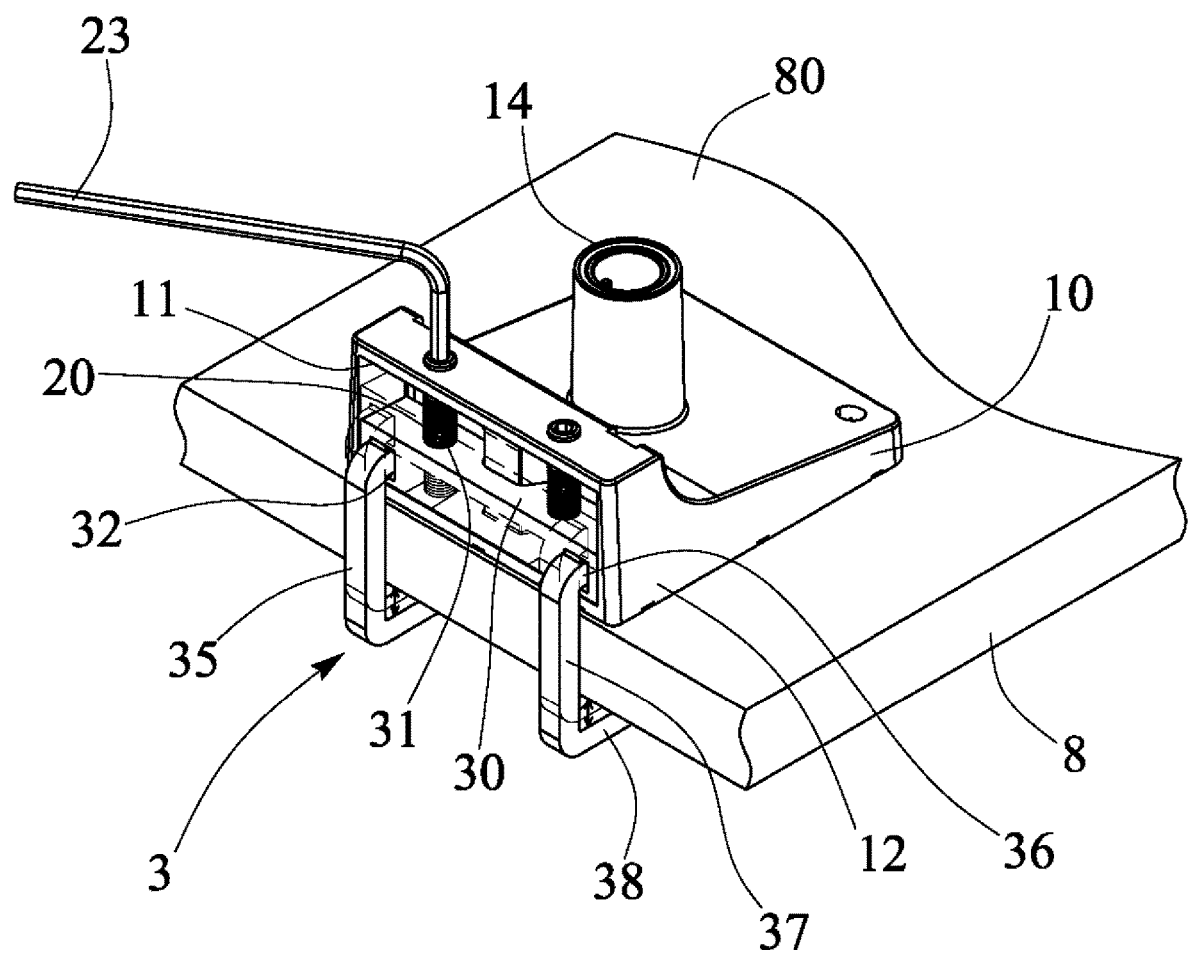
FIG. 3 is another perspective view similar to FIG. 2, illustrating the operation of the adjustable clamp.
Figure 6:
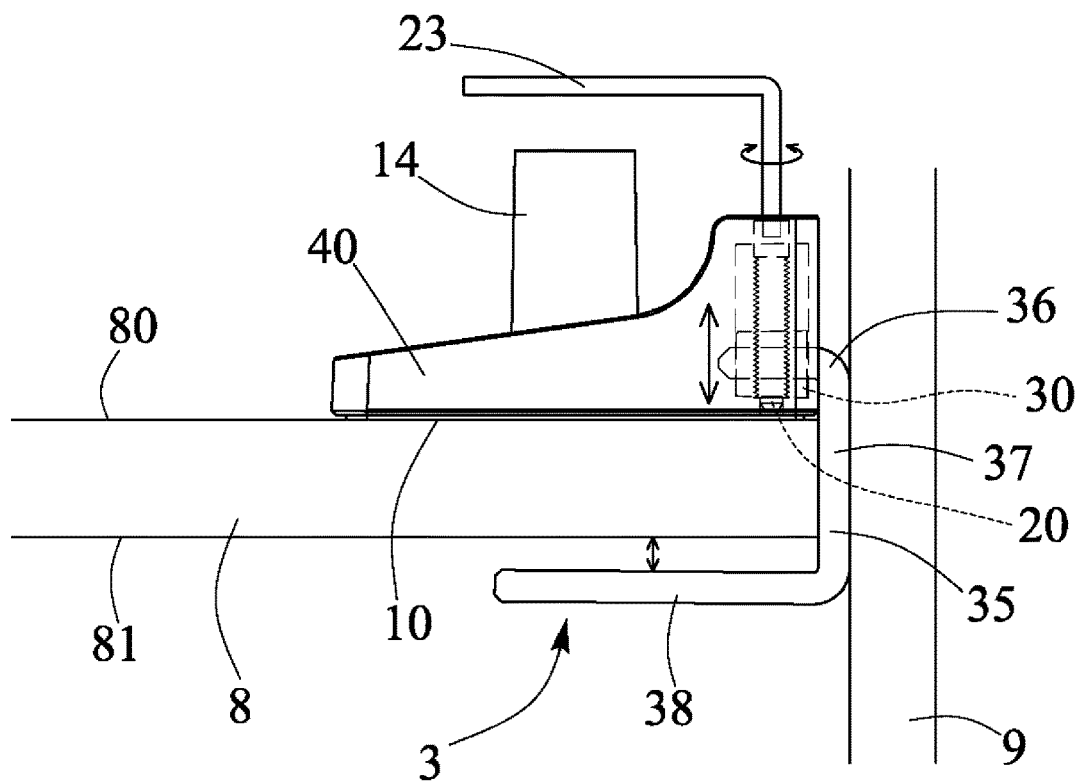

A clamping device 3 includes a base plate or sliding member or follower 30 slidably received or engaged in the compartment 11 of the carrier member 10 (FIGS. 3-6) and having a non-circular cross section or outer peripheral structure or configuration or contour similar to that of the compartment 11 of the carrier member 10 for allowing the follower 30 to be guided and limited to slide up and down along or relative to the compartment 11 of the carrier member 10 and for preventing the follower 30 from being pivoted or rotated or moved sidewise relative to the carrier member 10, the follower 30 includes one or more (such as two) screw holes 31 formed therein (FIGS. 1, 3) for threading or engaging with the fastener 20 and for allowing the follower 30 to be actuated or operated to slide or move up and down along or relative to the compartment 11 of the carrier member 10 when the fastener 20 is selectively rotated or driven by the driver tool 23, and thus for guiding and moving the follower 30 to slide or move up and down relative to the upper surface 80 of the table plate 8 (FIGS. 3, 6).

The follower 30 further includes one or more (such as two) anchoring openings or orifices 32 formed therein (FIGS. 1-3) for engaging with clamping or guiding or anchoring members or elements 35 and for detachably attaching or mounting or securing or clamping the carrier member 10 to the table plate 8. The anchoring elements 35 of the clamping device 3 each include an L or C-shaped structure or configuration having a relatively less width for allowing the anchoring elements 35 to be easily and quickly engaged through a tiny space that is formed or provided beside an edge portion of the table plate 8 or between the edge portion of the table plate 8 and a wall member 9 (FIG. 7) or the like, and to be easily and quickly attached and mounted to and engaged onto the table plate 8 (FIGS. 2-6) when the anchoring elements 35 is pivoted or rotated relative to the table plate 8 and the wall member 9 for about ninety (90) degrees.

The anchoring elements 35 each include a lateral or horizontal and upper leg or limb 36 for engaging into or with the anchoring orifices 32 of the follower 30 (FIGS. 2, 3), a vertical middle or intermediate leg or limb 37, and another lateral or horizontal but lower leg or limb 38 arranged and located below the upper limb 36 and parallel to the upper limb 36 and for forming or defining the L or C-shaped structure or configuration of the anchoring elements 35. It is preferable, but not necessary that the lower limb 38 includes a length greater than that of the upper limb 36. It is to be noted that the upper limbs 36 of the anchoring elements 35 are engaged with the anchoring orifices 32 of the follower 30 for allowing the upper limbs 36 and thus the anchoring elements 35 to be slid or moved up and down relative to the table plate 8 and the carrier member 10 together with the follower 30. It is preferable that the follower 30 includes a tilted or inclined lower or bottom surface 33 arranged and located below the respective anchoring orifice 32 of the follower 30 for guiding the upper limbs 36 of the anchoring elements 35 to easily and quickly engage into the anchoring orifices 32 of the follower 30.

Figure 7:
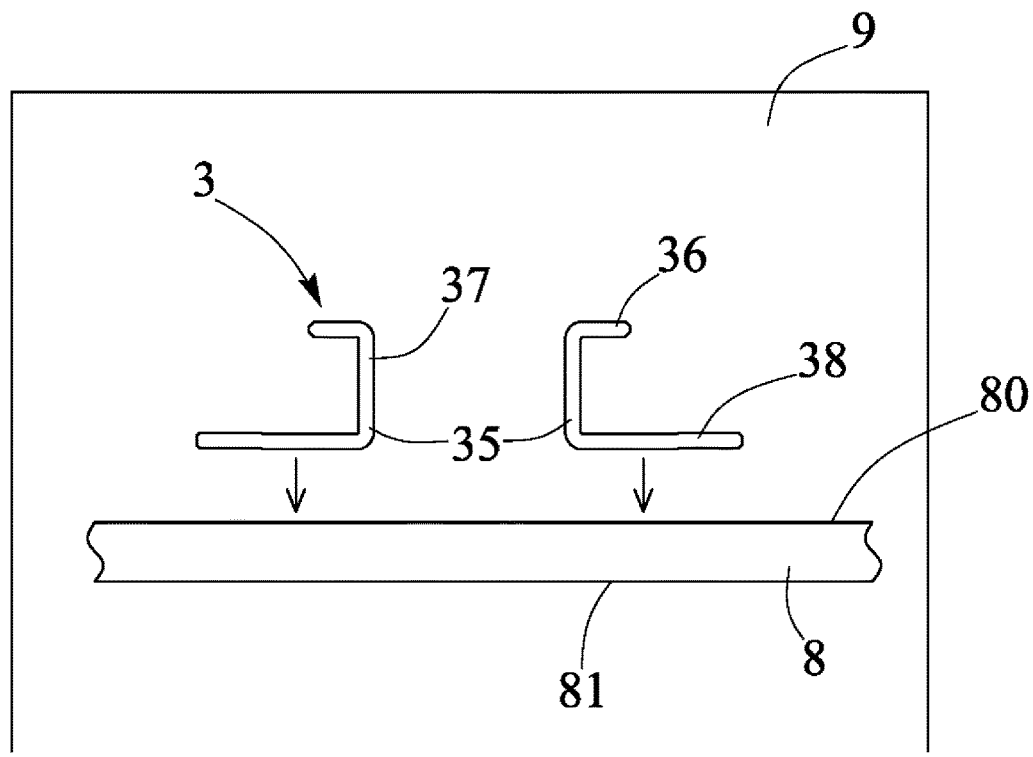
FIG. 7 is a front plan schematic view illustrating the operation of the adjustable clamp.

In operation, as shown in FIG. 7, the anchoring elements 35 may first be pivoted or rotated relative to the table plate 8 and the wall member 9 until the upper limbs 36 and the middle limbs 37 and the lower limbs 38 are parallel to the wall member 9 and engaged onto the wall member 9 for allowing the anchoring elements 35 to be easily and quickly engaged through the tiny space that is formed or provided beside an edge portion of the table plate 8 or between the edge portion of the table plate 8 and the wall member 9, and the anchoring elements 35 may then be pivoted or rotated relative to the table plate 8 and the wall member 9 for about ninety (90) degrees for allowing the table plate 8 to be disposed or arranged and located between the upper limbs 36 and the lower limbs 38 of the anchoring elements 35 (FIGS. 3-6).

The carrier member 10 may then be moved toward the wall member 9 (FIGS. 4, 5) and/or the upper limbs 36 of the anchoring elements 35 may then be relatively moved and engaged into the anchoring orifices 32 of the follower 30 for allowing the upper limbs 36 and thus the anchoring elements 35 to be slid or moved up and down relative to the table plate 8 and the carrier member 10 together with the follower 30. As shown in FIGS. 3 and 6, when the fasteners 20 are rotated or driven or actuated or operated by the user with the driver tool 23, the follower 30 and thus the anchoring elements 35 may then be slid or moved up and down relative to the table plate 8 and the carrier member 10 until the lower limbs 38 of the anchoring elements 35 are contacted or engaged with the lower or bottom surface 81 of the table plate 8, in order to force the lower limbs 38 of the anchoring elements 35 solidly engaged with the lower or bottom surface 81 of the table plate 8, and thus to solidly and stably attach or mount or secure the follower 30 and the carrier member 10 to the table plate 8. The width of the anchoring element 35 of the clamping device 3 is less than the length of the upper limb 36 and the lower limb 38 of the anchoring element 35 for allowing the anchoring element 35 to be easily and quickly engaged through a tiny space that is formed or provided beside an edge portion of the table plate 8 or between the edge portion of the table plate 8 and the wall member 9.

Figure 4:
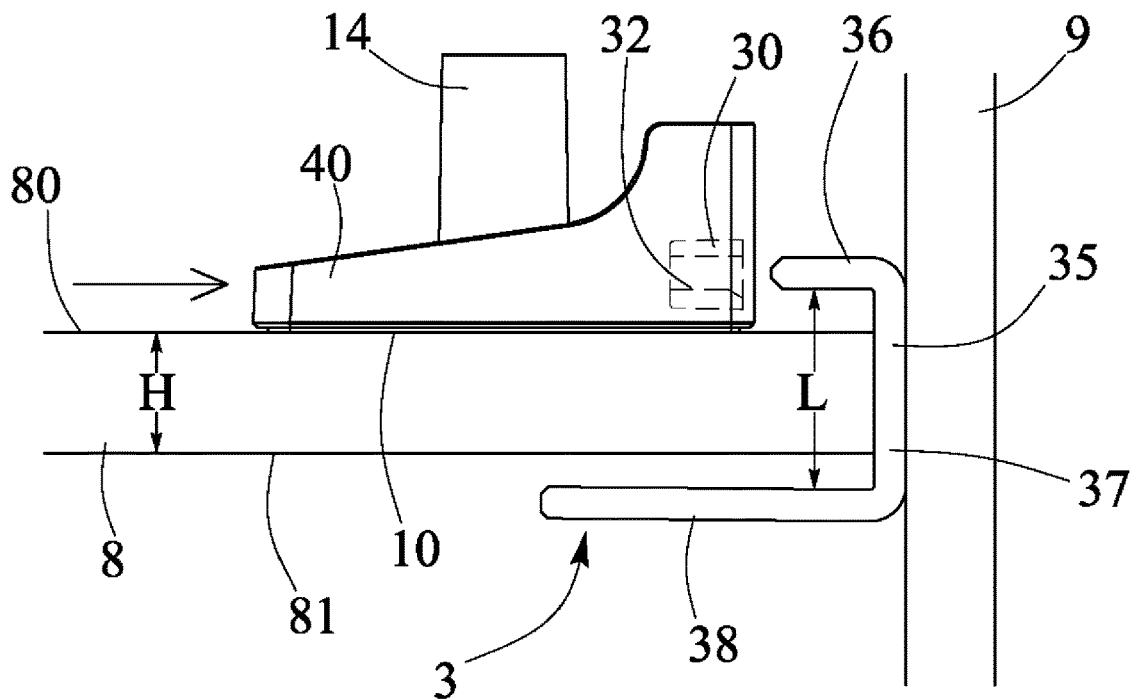
FIG. 4 is a side plan schematic view illustrating the operation of the adjustable clamp.
Figure 5:
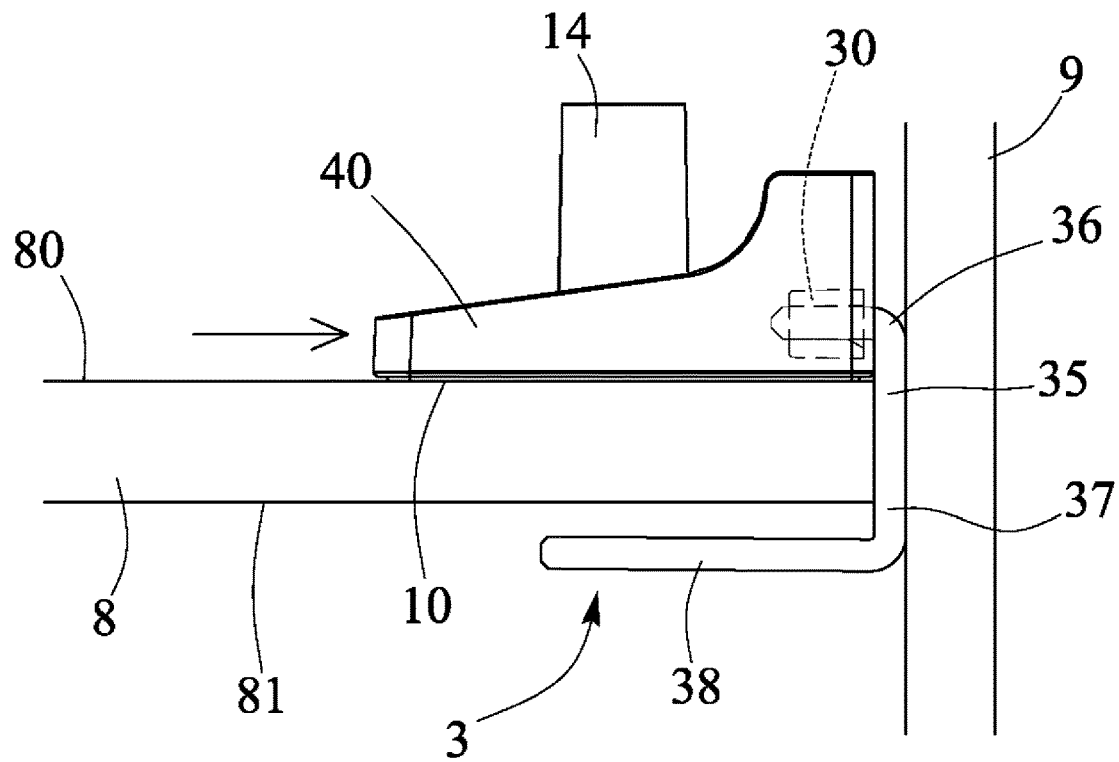
FIGS. 5, 6 are side plan schematic views similar to FIG. 4, illustrating the operation of the adjustable clamp.

It is further to be noted that the follower 30 may be forced to slide or move up and down relative to the table plate 8 with the fastener 20 and the driver tool 23 above the upper surface 80 of the table plate 8, such that the driver tool 23 may be easily and readily actuated or operated by the user, and the user is not required to be worked below the table plate 8. It is preferable that the follower 30 further includes a guide recess or slot 34 (FIG. 1) formed therein for slidably receiving or engaging with the guide protrusion 15 of the carrier member 10 and arranged for allowing the follower 30 to be guided or limited to smoothly and solidly and stably slide or move up and down relative to the carrier member 10 and the table plate 8. As shown in FIGS. 1 and 4, the length "L" of the middle limb 37 of the anchoring element 35 is greater than the thickness "H" of the table plate 8 for allowing the table plate 8 of different thicknesses to be arranged between the upper limb 36 and the lower limb 38 of the anchoring element 35.

An outer receptacle or cover or hood 40 may further be provided and attached and engaged onto the carrier member 10 for covering and shielding the carrier member 10, and the hood 40 includes an opening or aperture 41 formed therein for receiving or engaging with the attachment mechanism 14 of the carrier member 10, and may further one or more (such as two) oblong holes or grooves 42 formed therein and aligned with or communicating with the anchoring orifices 32 of the follower 30 for slidably receiving or engaging with the upper limbs 36 of the anchoring elements 35 and arranged for allowing the follower 30 and the upper limbs 36 of the anchoring elements 35 to be slid or moved up and down relative to the table plate 8 and the carrier member 10.

Accordingly, the adjustable clamp in accordance with the present invention may be easily actuated or operated by the user, and includes an anchoring board attachable to a carrier member for allowing the carrier member to be easily and quickly engaged through a tiny space beside an edge portion of a table plate and to be easily and quickly attached and mounted to the table plate.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clamp for attaching to a table plate, comprising:
a carrier member to be supported on the table plate, said carrier member including a compartment formed in said carrier member, said carrier member including an attachment mechanism for supporting an object,
at least one fastener rotatably received and engaged in said compartment of said carrier member and extended up and down relative to said carrier member,
a follower slidably received and engaged in said compartment of said carrier member, said follower including a screw hole formed in said follower for threading and engaging with said fastener and for allowing said follower to be moved up and down relative to said carrier member when said fastener is rotated relative to said carrier member, said follower including an anchoring orifice formed in said follower, and
a clamping device including an anchoring element having an upper limb for engaging with said anchoring orifice of said follower, a lower limb, and a middle limb arranged between said upper limb and said lower limb for forming a C-shaped structure, and for allowing the table plate to be engaged between said upper limb and said lower limb of said anchoring element, and for allowing said lower limb of said anchoring element to be forced to engage with the table plate and to secure said follower and said carrier member to the table plate when said follower and said anchoring element are moved up and down relative to the table plate and said carrier member with said fastener.

2. The clamp as claimed in claim 1, wherein said at least one fastener includes a non-circular engaging hole formed in said at least one fastener for engaging with a driver tool.

3. The clamp as claimed in claim 1, wherein said carrier member includes a guide protrusion extended into said compartment of said carrier member, and said follower includes a guide slot formed in said follower for slidably engaging with said guide protrusion of said carrier member and for guiding and limiting said follower to move relative to said carrier member.

4. The clamp as claimed in claim 1, wherein said follower includes a tilted surface located below said anchoring orifice of said follower for guiding said upper limb of said anchoring element to engage into said anchoring orifice of said follower.

5. The clamp as claimed in claim 1, wherein said carrier member includes a hood engaged onto said carrier member for covering said carrier member, said hood includes a groove formed in said hood and aligned with said anchoring orifice of said follower for slidably engaging with said upper limb of said anchoring element.

6. The clamp as claimed in claim 5, wherein said hood includes an aperture formed in said hood for receiving and engaging with said attachment mechanism of said carrier member.

\* \* \* \* \*